Aug. 15, 1933.    E. I. McKESSON    1,922,385
ARTIFICIAL LARYNX
Filed Feb. 11, 1927
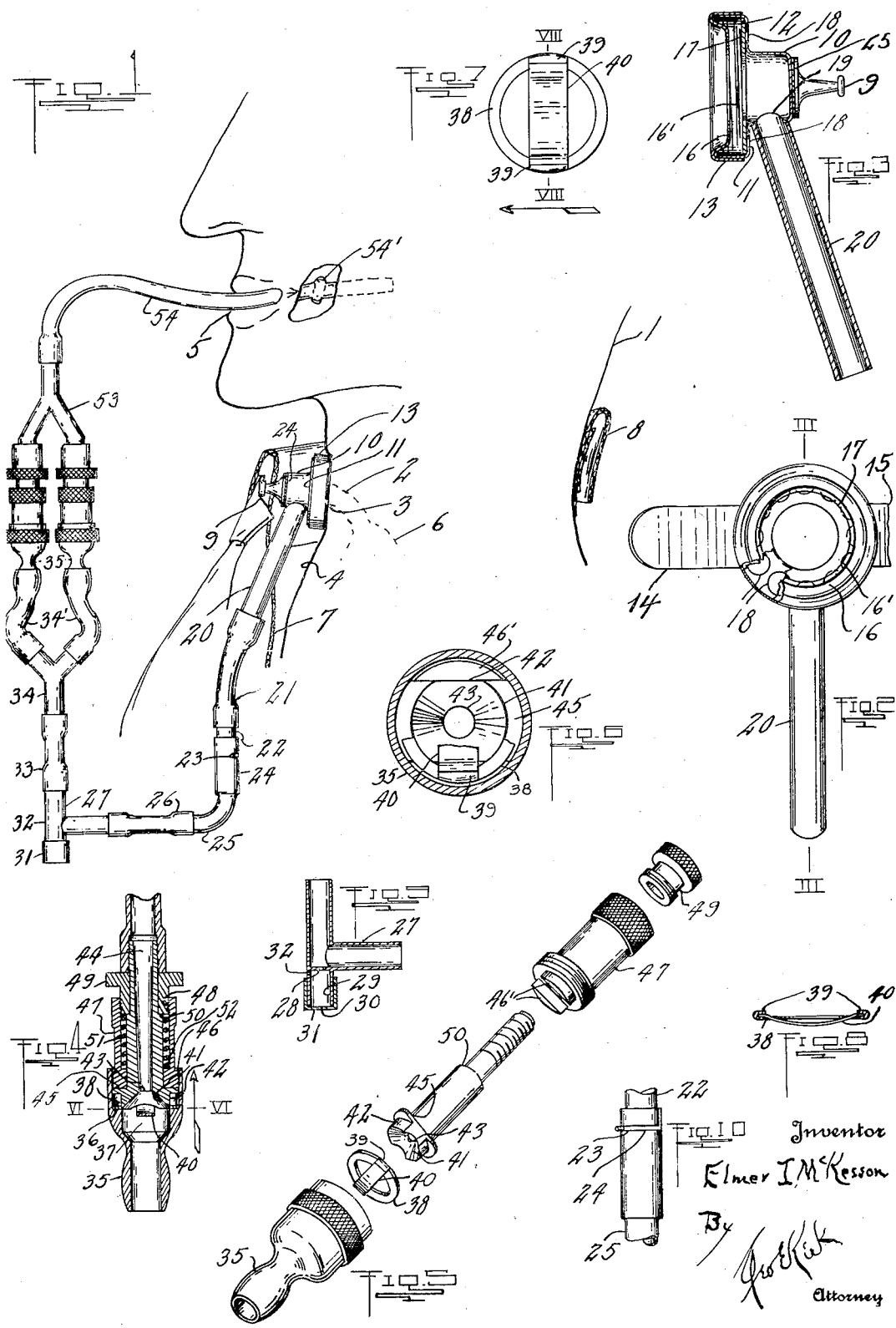
Inventor
Elmer I. McKesson
By
Attorney Patented Aug. 15, 1933

1,922,385

UNITED STATES PATENT OFFICE 1,922,385

ARTIFICIAL LARYNX

Elmer I. McKesson, Toledo, Ohio, assignor to The Vocophone Company, Toledo, Ohio, a Corporation of Ohio Application February 11, 1927. Serial No. 167,548

15 Claims. (Cl. 3—1)

This invention relates to air control or handling, especially for oral resonance control.

This invention has utility for mouth communication from the lungs as by-passing the larynx and throat.

Referring to the drawing:

Fig. 1 is a fragmentary view showing an embodiment of the invention as adapted for patients having larynx removed and the windpipe opening below such removal;

Fig. 2 is a fragmentary view from the neck or the body side of the fitting for communication with the wind pipe;

Fig. 3 is a section on the line III—III, Fig. 2;

Fig. 4 is a partial longitudinal section through a pitch generating device of Fig. 1;

Fig. 5 is a distributed view, in perspective, of the device of Fig. 4;

Fig. 6 is a section on the line VI—VI, Fig. 4, looking in the direction of the arrow;

Fig. 7 is a plan view of the vibrator and its mounting ring;

Fig. 8 is a section on the line VIII—VIII, Fig. 7;

Fig. 9 is a detail view, in section, of the condensation trap, as embodied in the device of Fig. 1; and Fig. 10 is a fragmentary view of the swivel connection between the wind pipe connection and the trap.

Individual 1 is shown as having windpipe 2 brought out from opening 3 near the front base of neck 4. Mouth 5 of this individual 1 is thus closed off from air communication downward from the mouth 5 to lungs 6 of the individual 1.

The individual 1 is shown as having in connection with clothing or upper garment 7, collar 8 coacting with collar button 9 herein shown as carried by tubular housing 10 having from its inward portion outwardly extended flange 11 terminating in cylindrical portion 12, over which slip fit ring 13 extends as a seat for resting as a cap for windpipe outlet opening 3. Fixed with the button 9 adjacent the housing 10 is a diametrically disposed pair of arms 14, 15, to be positioned inside the neck band and direct this valve device for maintained register at the opening 3. The ring 13 has overhang 16 as its bead outer seat portion for compression spring 16' abutting mica disk 17 for holding such disk normally in closed position as to ports 18 in the flange 11.

These openings or ports 18 in the flange 11 are for air intake at this inhalation valve, which is a check valve precluding exhalation flow. This housing 10 is shown as having port 19 with tube extension 20 which connects through duct 21 to fitting 22 having bayonet joint connection by pin 23 and L-slot 24 to elbow 25. This slot 24 has its portion extending peripherally of approximately 180° extent as a swivel joint for the elbow 25 and duct 26 to elbow 27, thus allowing angular shifting as may be convenient for the individual 1.

This elbow 27 is shown as having minor port 28 to extension 29 having open end 30 normally closed by slip cup 31 extending short of closing vent opening 32. The port 28 is accordingly a condensation collected drain allowing such to enter the extension 29 for deposit in the cup 31. This vent 32 is of capacity to allow the condensation to enter this chamber but is sufficiently small to avoid objectionable air leakage.

From this elbow 25, duct 33 extends to branch fitting 34 and ducts 34' connected with main tubular members 35 of the squawkers or pitch devices of this artificial larynx structure. Each member 35 has annular seat 36 at chamber 37. Ring 38 has integral lips 39 inwardly bent from its outer portions to grip against its flat rim portion 38 termini of vibrator 40 which may be a band of rubber, preferably diametrically disposed having a region of side clearance as to the rim and being slack mounted to serve as a reed.

The amplifier or trumpet is herein disclosed as having flare portion 41 with a pair of diametrically disposed straight or flap engaging portions 42 adjustably positioned as to the vibrator and ring unit and engaging the flexible band of the vibrator 40 inward from its termini as anchored by the lips 39. This flare portion 41 away from the vibrator 40 converges to restricted portion 43 from which there is gradually enlarging way 44 of the trumpet proper.

This trumpet is provided with outwardly extending flanged section 45 nesting in internally threaded portion 46 of the member 35 between prongs 46' abutting the ring 38 at the inwardly bent lips 39 for positively holding this vibrator mounting unit in its seat 36, and normally urged toward the vibrator unit 38, 40, by housing member 47 coacting with the threaded region 46. This housing 47 has internally threaded portion 48 with which coacts adjusting member 49 abutting shoulder 50 of the trumpet. Accordingly, as this adjusting member 49 is rotated relatively to the housing 47, the trumpet may be longitudinally shifted toward or from the vibrator 40.

Surrounding this trumpet and abutted by the adjusting member 49 is compression spring 51 abutting inwardly extending collar 52 of the housing 47. Accordingly, this spring 51 takes up adjustment-permitting slack or looseness between the member 49 as carrying the trumpet, and housing 47 as mounted with the tubular member 35, and carrying the vibrator and its mounting. It is accordingly clear that any angular shifting of the adjusted member 49 as to the housing 47 positively transmits an axial shifting of the trumpet as to the vibrator 40 to an extent desired for reducing the play of the vibrator by limiting its extension region to its vibrant length. This thrusting of the vibrator 40 is into the member 35 and away from the adjusting member 49. However, as air current from the lungs 6 of the individual 1 is delivered to the tubular member 35, this vibrator 40 is shifted toward the throat 43. The taking up of the vibrator slack to have such approximate its vibrant length region so controls the vibrator that in normal vibrator operation there is avoided shifting of the vibrator to block the throat 43.

Hereunder, by care in air current flow control, a user of this device, with a single trumpet or pitch attachment for the artificial larynx, may obtain as high as three tones from a single vibrator 40 independently of resetting or adjustment. This is due to control of air flow current say for developing its forced overtone and its half tone. Advantage accrues in adapting this device for operation with a plurality of pitch attachments. To this end there is herein disclosed a duplication of the vibrator and trumpet mechanism. The desired differentiation in pitch may be obtained by using a different character of vibrator 40 as to thickness or width or by a variation in the slack or tension therefor. In such a combination, the lower pitch trumpet device or squawker may have its vibrator 40 selectively cut out by the individual pneumatically. That is, the slack of the vibrator 40 or the strength of air current for tension or both combined may cooperate for shutting off the lower pitch device by having vibrator 40 block the throat 43, thereby allowing the air current to operate through the companion and higher pitch vibrator 40 and its trumpet 44. This is a lung air control from the individual who in this delivery of air volume to the tubular member 35 has such flow into branch 53 thence by duct 54 inserted into the mouth 5 say to extend back into the mouth along the inner side of the jaw so that there is freedom for cheek, tongue, and mouth lining muscular action and freedom of lip movement permitted as a range for oral expression in so forming the noises at the various pitches as to produce speech. Enlargement 54' rigid against collapse by teeth engagement, may serve as a convenient means for retaining the duct 54 in position for use.

The air volume as delivered by the individual may be nicely controlled by the lung action. The intake or inhalation valve as opened by compressing the helical spring 16' lifts the mica disk 17 clear of the ports 18, permits adequate inhalation volume to supplement any indrawing of air which may tend to occur from the duct 54. This latter supply as herein is negligible. However, it may have a tendency to develop condensation, as there is a tendency for condensation in the air as discharged from the lungs and passing by the duct 24. In order that this exhalation way from the duct 24 to the duct 54 may be maintained clear against water hammer or condensation disturbances, the low point in this line is effective at the elbow 27 as a condensation collecter in thimble 31. The user of this equipment may, according to the duration and character of the condensation, more or less frequently, remove the thimble 31 for discharge of the moisture therefrom and replace such without, really to any extent, interfering with the continuity of the operation of the device for maintaining audible communication.

There is capacity for unlimited inhalation and accordingly no embarrassment whatsoever to the individual for getting his breath whether or not the device be in use for conversation. With the device not in use the mouth tube 54 may be removed and can be put in the apparel of the wearer. There may be even disconnection of the elbow 25 from the duct 24 herein adjacent the wearer for freely allowing the intake air to pass or inhalation to supplement the intake air at the ports 18. This may be a warmed air from the body of the individual to temper chill of air which might be present from the duct supply past the disk 17 to the windpipe 2. Excess exhalation beyond the capacity of that permitted through the ducts 24 to 54 inclusive, may not embarrass the individual in any sense, for the seat or holding action of the valve device at the windpipe opening 3 is not so snug but that leakage may occur at the ring 13. In fact, in normal exhalation when the device is not used for speech, the exhalation is about the ring 13, while for speech use the individual 1 may place a finger on the tube 20 for more snugly positioning the ring 13 so that the squawker is thus operable. The ring 13 is readily removable from its frictional assembly to permit cleansing of the disk and valve elements.

What is claimed and it is desired to secure by Letters Patent is:

1. Resonance apparatus as a larynx substitute embodying in said apparatus multiple pitch trumpet means, there being duct supply means thereto for wind pipe flow generation and there being duct delivery means therefrom for common oral chamber resonating and pneumatically responsive means coacting against simultaneous operation of the multiple pitch trumpet means.

2. Resonance apparatus as a larynx substitute embodying a plurality of differential pitch trumpets, there being pneumatically responsive means coacting against simultaneous operation of the differential pitch trumpets, branched duct supply means to the trumpets, a wind pipe connection, a tube for the apparatus to the branched duct supply means, and resonating delivery coacting duct means for the apparatus.

3. Resonance apparatus as a larynx substitute embodying a plurality of trumpets having vibrant means coacting for different pitch for the trumpets, branched duct supply means providing connection from a flow generation source to the trumpets, and resonating delivery coacting duct means having branch connection to the trumpets.

4. Resonance apparatus as a larynx substitute embodying a plurality of trumpets, adjustable vibrant means for determining different pitch for the trumpets, branched duct supply means providing connection from a flow generation source to the trumpets, and resonating delivery coacting duct means having branch connection to the trumpets.

5. An artificial larynx housing provided with windpipe connecting means one way therefrom and mouth connecting means the other way therefrom, said housing having a trumpet flare passage providing a seat, and an additional unit comprising a vibrant member and a member holding mounting assembled with the member to establish tension for the member independently of the passage and provide a unit with the member, which unit while retaining the vibration member under tension may be readily assembled into and removed from said housing.

6. An artificial larynx comprising a tubular member provided with windpipe connecting means one way therefrom and mouth connecting means the other way therefrom, said member having therethrough a passage providing seat, a flexible vibrator strip, and an open ring mounting providing terminal anchoring means for the vibrator assembled strip to establish tension for the strip independently of the tubular member and provide a unit with the strip, which unit under said established tension may be readily assembled into and removed from said seat.

7. An artificial larynx comprising a tubular member provided with windpipe connecting means one way therefrom and mouth connecting means the other way therefrom, said member providing an annular seat, a ring in said seat, a flexible vibrator strip across said ring and mounted thereby at an established tension independently of said seat, said ring and strip forming a unit at said tension for assembly and removal from the member, and a vibrator further tension adjusting device shiftable as to the unit ring and strip.

8. An artificial larynx comprising a tubular member provided with windpipe connecting means one way therefrom and mouth connecting means the other way therefrom, said member providing an annular seat, a ring in said seat, a flexible vibrator across said ring mounted thereby at an established tension independently of said seat, said ring and vibrator forming a unit at said tension for assembly and removal from the member, and a further tension adjusting device shiftable as to the unit for engaging the vibrator adjacent its connection to the ring.

9. An artificial larynx comprising a tubular member provided with windpipe connecting means one way therefrom and mouth connecting means the other way therefrom, said member having a seat, a ring, a slack tension flexible vibrator across said ring and mounted thereby at an established tension independently of said seat, said ring and vibrator forming an assembly unit for introduction into and removal from the member, and a trumpet adjustable further to restrict play of the vibrator to its vibrant portion.

10. An artificial larynx comprising a tubular member provided with windpipe connecting means one way therefrom and mouth connecting means the other way therefrom, a ring in said member, a slack tension flexible vibrator across said ring and mounted thereby, a housing providing a seat for detachable assembly of the ring and vibrator as a unit therewith, and a trumpet in the housing adjustable relatively to the vibrator unit further to restrict the vibrator to its vibrant length.

11. An artificial larynx comprising a tubular member provided with windpipe connecting means one way therefrom and mouth connecting means the other way therefrom, a ring in said member, a slack tension flexible vibrator across said ring and mounted thereby, a housing providing a seat for detachable assembly of the ring and vibrator as a unit therewith, a trumpet in the housing adjustable relatively to the vibrator unit further to restrict the vibrator to its vibrant length, and a spring between the trumpet and housing to take up trumpet adjusting play therebetween.

12. A larynx device including mechanical tone delivering means embodying a housing provided with windpipe connecting means one way therefrom and mouth connecting means the other way therefrom, a trumpet with threaded engagement in the housing for adjustment relatively thereto, and a spring about the trumpet for coacting with the housing and taking up trumpet adjustment looseness between the trumpet and housing.

13. In a trachea connection, a housing having a central exhalation port, surrounding greater capacity inhalation port means, and an open center disk for closing the inhalation port means.

14. In a trachea connection, a housing having a central exhalation port, surrounding greater capacity inhalation port means, an open center disk for closing the inhalation port means, a slip cover ring for the housing providing a seat, and a spring between said seat and disk tending normally to hold the inhalation port means closed.

15. A windpipe connection detachable unit in association with a normal article of apparel, said unit comprising a collar button for fixing the location of the unit with the article of apparel, a ported device rearwardly from the button for external location at a windpipe orifice, a sealing pad for the device at the orifice, a duct from the device, and a pair of diametrically disposed external extension means from the device fixed with the device and button and toward the pad from the collar for retaining the device pad in windpipe orifice proximity.

ELMER I. McKESSON.